United States Patent [19]

Dzus

[11] 4,130,929
[45] Dec. 26, 1978

[54] WOUND SPRING RECEPTACLE

[75] Inventor: Julius F. Dzus, Islip, N.Y.

[73] Assignee: Dzus Fastener Co., Inc., West Islip, N.Y.

[21] Appl. No.: 852,553

[22] Filed: Nov. 17, 1977

[51] Int. Cl.² ............................................. B23P 19/04
[52] U.S. Cl. .................... 29/456; 24/221 A
[58] Field of Search ............ 29/456; 24/221 R, 221 A

[56] References Cited

U.S. PATENT DOCUMENTS

| 2,199,113 | 4/1940 | Peirce | 29/456 |
| 2,347,675 | 5/1944 | Dzus | 24/221 A |
| 2,948,953 | 8/1960 | Rayburn | 29/456 UX |
| 3,132,409 | 5/1964 | Freeman | 29/456 X |
| 3,146,521 | 9/1964 | Steinmeyer | 29/456 X |

FOREIGN PATENT DOCUMENTS 873599 7/1942 France .................... 24/221 R

Primary Examiner—Charlie T. Moon
Attorney, Agent, or Firm—Kane, Dalsimer, Kane, Sullivan & Kurucz

[57] ABSTRACT

A spring receptacle and its method for formation so that it can be used for removable engagement with a stud having a spiral cam slot therein to form a fastener to couple two members together. The receptacle is formed with a hollow receptacle body open on at least one end and adapted to be mounted to one of the members. An opening is in the body in alignment with an opening in the one member. A pair of opposed holes are in the body. An elongated wire of a spring material is passed through the holes and is long enough to extend across the body and outwardly therefrom through both holes. One of the body and wire is then held and the other of the body of wire is rotated a predetermined amount to cause the wire to coil within the body and form an integral coiled spring and cross bar fixed in the body. Thereafter, when the receptacle is mounted on the one member and engaged with a stud mounted on the other member and extended through the opening in the one member and into the body relative rotation between the stud and receptacle will cause the coiled spring to deflect as the cross bar follows the cam slot in the stud to the fastened position coupling the two members.

9 Claims, 8 Drawing Figures

U.S. Patent   Dec. 26, 1978   Sheet 1 of 3   4,130,929
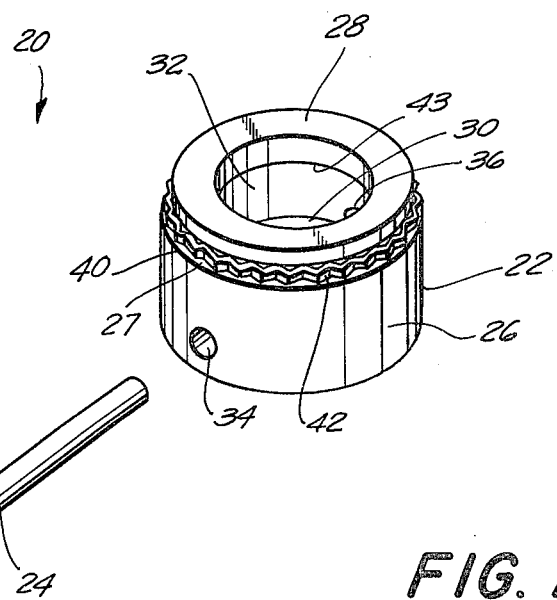
FIG. 1
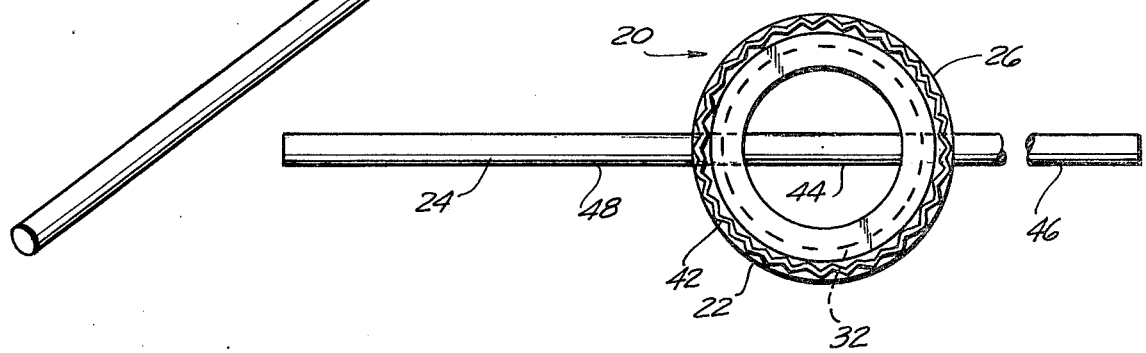
FIG. 2
FIG. 3
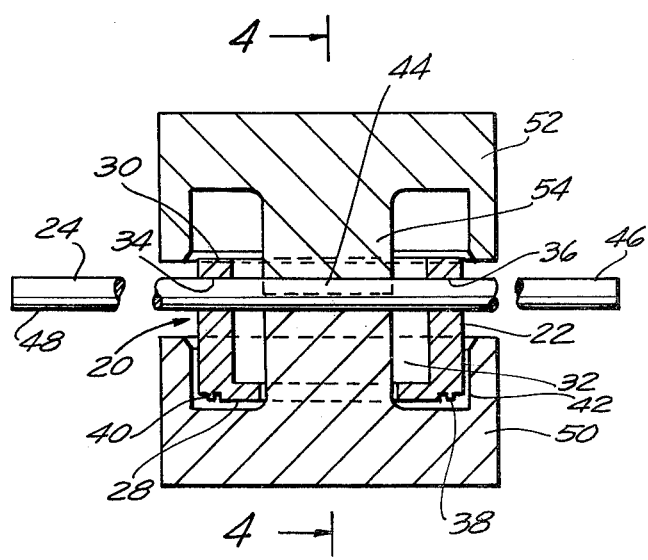
FIG. 4
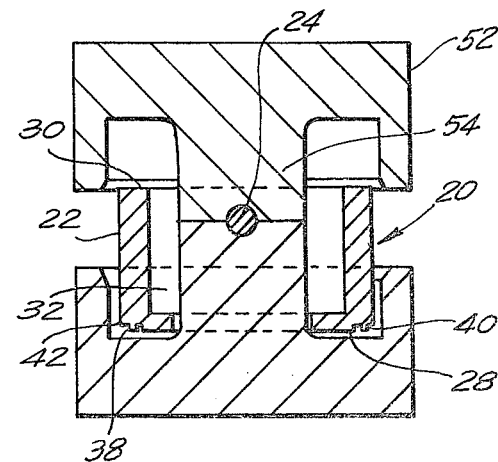

WOUND SPRING RECEPTACLE

BACKGROUND OF THE INVENTION

There are a variety of different types of receptacles used for stud and receptacle assemblies particularly of the well known type known as quarter turn fasteners. In that type of structure generally a helical slot is commonly provided in the stud member and a cam follower or cross bar is mounted in the receptacle so that when one is rotated with respect to the other the bar will follow the slot between the open and closed position. To accommodate the axial movement of the bar as it follows the cam slot, a spring means is provided on the receptacle or stud.

It has been common practice to mount a separate spring element within the receptacle along with a separate cam follower or cross bar. Manufacturing procedures require that the receptacle housing or body be formed separately along with the spring and cam follower elements. This is true whether the cam follower and spring are one or two pieces. The parts are then assembled to form a receptacle assembly for engagement with a stud member having a spiral cam slot formed therein. Examples of the development of this type of construction as the art has progressed through the years appear in U.S. Pat. Nos. 2,347,675; 2,443,309; 2,499,574; 2,513,553; 2,527,408; 2,585,241; Re 24,028; 3,535,752; 3,656,466; 3,827,110; 3,861,004; 3,874,041; 3,943,611; and 3,975,804.

To accommodate assembly of a multi-piece receptacle, it is necessary that sufficient space be provided to facilitate the installation. Also, a number of different manufacturing steps are required since the components are formed separately. Another difficulty that arises is to make certain during assembly that the spring and cam follower are properly and strongly mounted so that they can accommodate the required forces applied to the assembly both in respect to a tension force and a torsion load.

SUMMARY OF THE INVENTION

With the above background in mind, it is among the primary objectives of the present invention to provide a unique receptacle assembly which includes a body or housing, and spring means and a cam follower cross bar formed in the housing for use with a common type of stud having a spiral cam slot formed therein. The receptacle is unique in that the spring and cam follower cross bar are formed within the receptacle body. There is no separate formation of parts and then later assembly thereof to form the receptacle assembly.

The spring and cross bar are formed by winding a wire material within a hollow receptacle body housing thereby drawing the end portions of the wire within the housing as it is coiled and terminating with a cross bar and a series of coils fixed in the housing. The coils provide the necessary spring action for the wire and the central cross bar portion provides the cam follower for the slotted stud. The spring and cross bar combination formed by the wound spring is fixed and enclosed so that it is designed to take significant tension and torsion loads. The ultimate receptacle assembly is more compact and smaller since no additional space is needed for installaion of separate components. The spring and cross bar are formed in the receptacle thereby reducing manufacturing steps and assembly time.

The result of the present invention is a compact, inexpensive and easy to use receptacle assembly with a build-in spring means and cam follower for use with a conventional slotted stud, for example of the quarter turn type to fasten and unfasten two members together quickly and efficiently.

The receptacle body is designed to permit ease of access to the interior thereof for winding of the wire and with a pair of opposed holes through which the wire initially extends and is drawn into the interior of the body. The receptacle also includes a reduced neck portion having a knurled surface adjacent on outer shoulder for facilitating mounting of the receptacle in one of the members, and an inner shoulder to restrict movement of the wire in one direction as it is being wound in the body.

It is contemplated that either the receptacle or the wire can be held in fixed position and the other of the two rotated to achieve the desired winding action.

In summary, a unique method of forming a unique spring receptacle is contemplated by the present invention. The receptacle is designed for removable engagement with a stud having a spiral cam slot therein to form a fastener to couple two members together. A hollow receptacle body open on at least one end is provided with means thereon for mounting the receptacle to one of the members to be coupled and an opening therein in alignment with an opening in the member. A pair of diametrically opposed holes are located in the body. An elongated wire of spring material is passed through the holes and is long enough to extend across the body and outwardly therefrom through both holes. One of the body and wire is held and the other of the body of wire is rotated relative thereto a predetermined amount causing the wire to coil within the body to form an integral coiled spring and cross bar fixed in the body. Thereafter, when the receptacle is mounted on the one member and engaged with a stud mounted on the other member and extended through the opening in the one member and into the body, relative rotation between the stud and receptacle will cause the coiled spring to deflect as the cross bar follows the cam slot in the stud to the fastened position coupling the two members.

With the above objectives among others in mind, reference is made to the attached drawings.

BRIEF DESCRIPTION OF THE DRAWINGS

In the drawings:

FIG. 1 is an exploded perspective view of the receptacle body and wire portions thereof prior to assembly;

FIG. 2 is a fragmentary top plan view thereof with the wire positioned in the receptacle body prior to winding;

FIG. 3 is a fragmentary sectional elevation view thereof showing forming tools in engagement with the wire and receptacle body prior to formation;

FIG. 4 is a sectional end view thereof taken along the plane of line 4—4 of FIG. 3;

DETAILED DESCRIPTION

Figure 5:
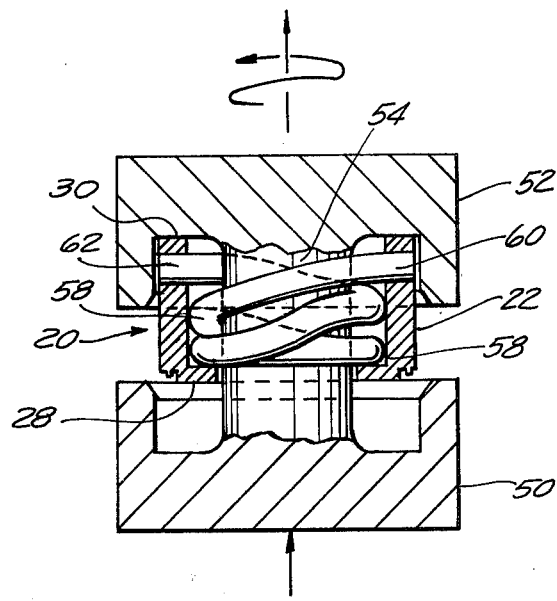
FIG. 5 is a sectional view thereof after the wire has been rotated relative to the body to form the receptacle.

Receptacle 20 is depicted in component form prior to assembly and manufacture in FIG. 1 and includes a body 22 and an elongated wire 24. Body 22 can be formed of any conventional metal or plastic material and it is convenient to use a spring-like material such as spring steel or piano wire for the elongated length of wire 24.

Body 22 is formed in a tubular configuration having a cylindrical side wall 26, an open upper end 28 and an open bottom end 30. The interior of body 22 is hollow to form an interior chamber 32. A pair of diametrically opposed holes 34 and 36 are formed in the cylindrical side wall 26. The upper portion of side wall 26 forms a neck 27 and has a reduced diameter outer surface 38 which serves to form an annular outer shoulder 40 where the upper portion joins with the remainder of side wall 26. Neck 27 also has a reduced diameter inner surface 41 which serves to form an inner shoulder 43 where neck 27 joins the remainder of side wall 26. Mounted on shoulder 40 is a knurled ring 42, or alternatively, a knurled surface to facilitate mounting of the receptacle to a member.

The next step in manufacture is depicted in FIG. 2 where wire 24 is extended through holes 34 and 36 in the body until a portion 44 forms a diammetrical bar in chamber 32 of the body and an end portion 46 extends outwardly from one side of the body and a second portion 48 extends from the other side of the body. In this condition, the receptacle components are positioned in a forming tool arrangement which includes a base half 50 and a rotatable upper half 52. A central arm 54 is formed in the upper half 52 and so that it extends downwardly through an opening in one end of the receptacle body 22 to engage with central portion 44 of the wire. FIGS. 3 and 4 depict this condition with the receptacle body held in fixed position in bottom half 50 of the rotatable upper half 52 of the tool extended through open bottom end 30 in engagement with central portion 44 of the wire for rotation thereof. Thereafter, the upper portion 52 is rotated as depicted in FIG. 5 which serves to coil wire 24 since the slot 56 in arm 54 is in engagement with central portion 44. As it is being coiled wire 24 is restricted from axial movement through opening 30 by engagement with arm 54 and from axial movement through opening 28 at the end of the body by engagement with inner shoulder 43. The amount of rotation is a matter of choice with the object being to form a plurality of coils 58 within the body 22 until the end portions 46 and 48 are entirely within the body with the tip 60 of the end portion 46 in the hole 36 and the tip 62 of end portion 48 in the hole 34. In this condition, the central portion 44 which is held by the tool forms a cross bar for engagement with a stud and the coils 58 form a spring member for permitting axial movement of the cross bar as it shifts in the slot of a stud. The outer surfaces of coils 58 engage with the inner surfaces of side wall 26 providing a snug and tight fit and the tips 60 and 62 are held in holes 36 and 34 due to deformation in the twisting action to provide a rigid positioning of the coiled wire within the receptacle body and a receptacle which is highly resistant to tension and torsion forces as well.

Figure 6:
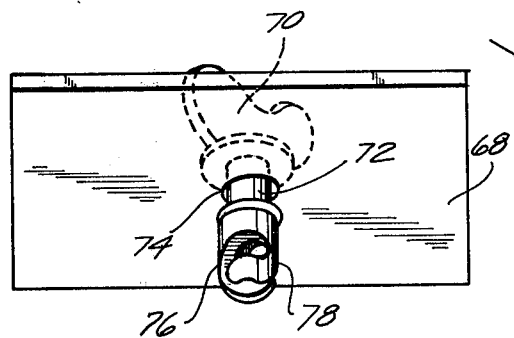
FIG. 6 is an exploded perspective view of the receptacle mounted to one member to be fastened and a stud mounted to the other member to be fastened.
Figure 6:
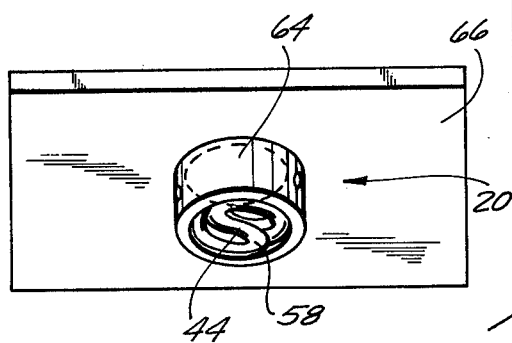

It has been found convenient to use the tool with arm 54 extending through the bottom open end 30 to engage and coil the wire and the upper open end 28 forms the access entry for stud. Alternatively, body 22 can be reversed and tool arm 54 extended through open upper end 28 into engagement with bar 44 for rotation and coiling of the wire. The forming tool halves 50 and 52 are then removed and the receptacle 20 is in condition for use. As shown in FIG. 6, the receptacle 20 is mounted in an opening 64 of a member such as a panel 66 to be fastened and unfastened with a companion surface of panel 68. Mounting of the receptacle is facilitated by the presence of the knurled ring 42 which engages with the surfaces forming opening 64 in member 66 and can be forced or rigidly frictionally held in position with the reduced diameter upper portion or neck of the receptacle body in the opening and the remainder of the body located on one side of the panel 66. Other conventional ways of mounting receptacle 20 on member 66 can be easily envisioned.

A conventional stud having an enlarged head portion 70 with finger gripping means thereon and a reduced diameter shank portion 72 is mounted to panel 68 by passing the shank portion 72 through an opening 74 in the panel until the undersurface of head portion 70 engages with the adjacent surface of the panel 68. The end of shank portion 72 distal from the head portion is formed with a spiral cam slot 76.

Figure 7:
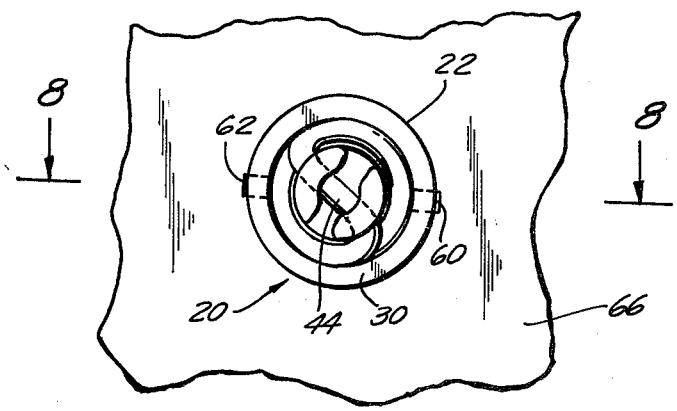
FIG. 7 is a fragmentary bottom view of the members in fastened position with the stud and receptacle assembled.
Figure 8:
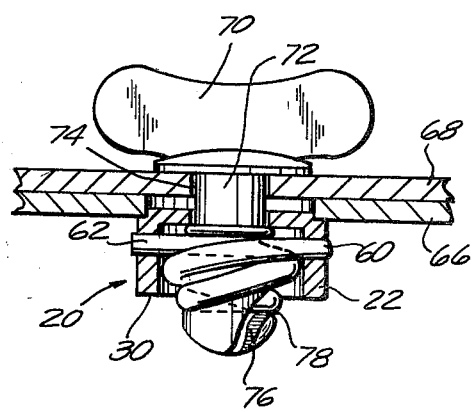
FIG. 8 is a sectional elevation view thereof taken along the plane of line 8—8 of FIG. 7.

Passage of shank 72 then through opening 64 in member 66 will bring the cam slot 76 into engagement with portion 44 of the coiled wire which forms a cross bar or cam follower. Rotation of the stud causes the cross bar or cam follower 44 to axially move along the slot 76 whereby the axial movement is accommodated by coils 58 of the spring and the two panels 66 and 68 are drawn together into tight fastened engagement. To facilitate the fastening action, the spiral cam slot 76 terminates in a detent 78 in which cross bar 44 seats. This condition is depicted in FIG. 7 and 8 of the drawings.

To unfasten the assembly, sufficient force is applied to rotate the stud in the opposite direction by grasping enlarged head 70 whereby the spring will resiliently move to permit wire 44 to unseat from detent 78 and pass back along cam slots 76 until the stud and receptacle 20 are disassembled. The panel 66 and 68 can then be displaced from one another.

The result is a compact small receptacle 20 which can be used with a conventional type of cam slotted stud. The receptacle assembly is formed with the cam follower and spring portions being formed within the receptacle thereby reducing assembly and manufacturing steps and space needed for installation. The ultimate assembly has the cross bar and spring fixed and enclosed so that the assembly is highly resistant to both torsion and tension forces.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

I claim:

1. Method of forming a spring receptacle for removable engagement with a stud having a spiral cam slot therein to form a fastener to couple two members together comprising; forming a hollow receptacle body open on at least one end and with means thereon for mounting the receptacle to one of the members to be coupled and an opening therein alignment with an opening in the one member, locating a pair of opposed holes in the body, passing an elongated wire of spring material through the holes and the wire being long enough to extend across the body and outwardly therefrom through the holes, and holding one of the body and wire and rotating the other of the body and wire a predetermined amount causing the wire to coil within the body to form an integral coil spring and cross bar fixed in the body so that when the receptacle is mounted on the one member and engaged with the stud mounted on the other member and extended through the opening in the one member and into the body, relative rotation between the stud and receptacle will cause the coil spring to deflect as the cross bar follows the cam slot in the stud to the fastened position coupling the two members together.

2. The invention in accordance with claim 1 wherein the holes are diametrically opposed.

3. The invention in accordance with claim 1 wherein the body is tublar in configuration, is open at both ends and has inner and outer side walls.

4. The invention in accordance with claim 3 wherein the end portion of the body containing the opening for alignment with the opening in the one member has a reduced outer and inner diameter to form an outer and an inner shoulder on the body and a neck.

5. The invention in accordance with claim 4 wherein a knurled annular ring is positioned on the outer shoulder and around a part of the neck to facilitate mounting of the body to the member.

6. The invention in accordance with claim 1 wherein the stud is of the type with an enlarged head position and a narrower diameter shank portion extending therefrom with the spiral cam slot in the end of the stud opposite to the head end so that when the stud is passed through an opening in the outer member of the underside of the head will engage with the surface of the other member surrounding the opening therein.

7. The invention in accordance with claim 1 wherein the body is held in fixed position and the wire is rotated relative to the body.

8. The invention in accordance with claim 7 wherein the wire is rotated by grasping the portion thereof within the body and rotating the wire in a predetermined direction a predetermined amount so that the wire is coiled within the body by drawing the wire through the opposed openings until the outer diameter of the coils engage with the inner side wall of the body and the ends of the wire are fixed in the holes.

9. The invention in accordance with claim 8 wherein the end portion of the body containing the opening for alignment with the opening in the one member has a reduced outer and inner diameter to form an outer and inner shoulder on the body and a neck, the wire being restricted in movement in one direction by engagement with the inner shoulder.

* * * * *